(12) United States Patent
 Costiner et al.

(10) Patent No.: US 8,396,571 B2
(45) Date of Patent: Mar. 12, 2013

(54) PROCESS AND SYSTEM FOR MULTI-OBJECTIVE GLOBAL OPTIMIZATION OF MAINTENANCE SCHEDULES

(75) Inventors: Sorin Costiner, Somerville, MA (US); Howard A. Winston, Woodbury, CT (US); Jihua Wang, Unionville, CT (US); Alexander I. Khibnik, Glastonbury, CT (US); Ravi Rajamani, West Hartford, CT (US); Thomas R. Matthis, Manchester, CT (US); Ricardo A. Benitez, Bolton, CT (US); Julie A. Ireland, East Hampton, CT (US); Robert M. Cohen, West Hartford, CT (US); Ellen Cohen, legal representative, West Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 413 days.

(21) Appl. No.: 11/725,934

(22) Filed: Mar. 19, 2007

(65) Prior Publication Data
 US 2008/0234979 A1 Sep. 25, 2008

(51) Int. Cl.
 *G01B 3/44* (2006.01)
 *G05B 13/02* (2006.01)
 *G06F 15/18* (2006.01)
 *G06F 19/00* (2006.01)
 *G06N 5/02* (2006.01)
 *G06Q 10/00* (2006.01)
 *G21C 17/00* (2006.01)

(52) U.S. Cl. ............ 700/28; 700/100; 702/34; 702/182; 702/184; 705/7.12; 705/7.24; 705/7.28; 706/14; 706/50

(58) Field of Classification Search ............... 700/28, 700/175, 100; 701/29; 702/34, 184, 182; 703/2, 7, 13, 22; 705/7.12, 7.24, 7.28; 706/14, 706/50
See application file for complete search history.

(56) References Cited

U.S. PATENT DOCUMENTS
(Continued)

FOREIGN PATENT DOCUMENTS
EP 509817 A1 * 10/1992
EP 1240080 B1 8/2004
(Continued)

OTHER PUBLICATIONS

"Hierarchical generation of Pareto optimal solutions in large-scale multiobjective systems"; Caballero, R. et. al, Computers & Operations Research, vol. 29, Issue 11, (Dec. 2000), pp. 1537-1558.*

(Continued)

*Primary Examiner* — Dave Robertson
*Assistant Examiner* — Jennifer L Norton
(74) *Attorney, Agent, or Firm* — Bachman & LaPointe, P.C.

(57) ABSTRACT

A process for optimizing maintenance work schedules for at least one engine includes the steps of retrieving at least one set of data for an engine from a computer readable storage medium; selecting at least one scheduling parameter for the engine; selecting a set of maintenance rules for the engine; selecting at least one maintenance work decision; selecting at least one objective for the engine; optimizing the at least one objective to generate at least one optimal maintenance work decision; and generating at least one optimal maintenance work schedule for the engine.

25 Claims, 8 Drawing Sheets

U.S. PATENT DOCUMENTS

| | | | |
|---|---|---|---|
| 5,241,465 A | | 8/1993 | Oba et al. |
| 5,477,827 A | * | 12/1995 | Weisman et al. ............. 123/436 |
| 5,596,712 A | * | 1/1997 | Tsuyama et al. ................ 714/26 |
| 5,778,381 A | | 7/1998 | Sandifer |
| 5,828,969 A | | 10/1998 | Chamney |
| 5,838,261 A | | 11/1998 | Lauta |
| 5,884,202 A | | 3/1999 | Arjomand |
| 5,931,877 A | | 8/1999 | Smith |
| 5,931,878 A | | 8/1999 | Chapin |
| 6,067,486 A | | 5/2000 | Aragones et al. |
| 6,216,109 B1 | | 4/2001 | Zweben et al. |
| 6,260,048 B1 | | 7/2001 | Carpenter et al. |
| 6,308,120 B1 | | 10/2001 | Good |
| 6,408,258 B1 | | 6/2002 | Richer |
| 6,418,361 B2 | | 7/2002 | Sinex |
| 6,442,459 B1 | | 8/2002 | Sinex |
| 6,477,452 B2 | | 11/2002 | Good |
| 6,487,479 B1 | | 11/2002 | Nelson |
| 6,529,620 B2 | | 3/2003 | Thompson |
| 6,571,158 B2 | | 5/2003 | Sinex |
| 6,580,982 B2 | | 6/2003 | Sinex |
| 6,598,940 B2 | | 7/2003 | Sinex |
| 6,606,546 B2 | | 8/2003 | Sinex |
| 6,671,593 B2 | | 12/2003 | Sinex |
| 6,684,136 B2 | | 1/2004 | Sinex |
| 6,684,349 B2 | | 1/2004 | Gullo et al. |
| 6,691,006 B2 | | 2/2004 | Sinex |
| 6,691,064 B2 | | 2/2004 | Vroman |
| 6,728,610 B1 | | 4/2004 | Marshall et al. |
| 6,738,748 B2 | | 5/2004 | Wetzer |
| 6,742,000 B1 | | 5/2004 | Fantasia et al. |
| 6,795,758 B2 | | 9/2004 | Sinex |
| 6,799,154 B1 | | 9/2004 | Aragones et al. |
| 6,810,406 B2 | | 10/2004 | Schlabach et al. |
| 6,820,038 B1 | | 11/2004 | Wetzer et al. |
| 6,826,461 B2 | | 11/2004 | Sinex |
| 6,832,205 B1 | | 12/2004 | Aragones et al. |
| 6,871,160 B2 | * | 3/2005 | Jaw ................................ 702/184 |
| 6,901,377 B1 | | 5/2005 | Rosenfeld et al. |
| 6,907,416 B2 | * | 6/2005 | Tasooji et al. ................... 706/50 |
| 6,980,959 B1 | | 12/2005 | Garrow et al. |
| 7,031,941 B2 | | 4/2006 | Garrow et al. |
| 7,047,169 B2 | * | 5/2006 | Pelikan et al. ..................... 703/2 |
| 7,068,301 B2 | | 6/2006 | Thompson |
| 7,076,396 B2 | * | 7/2006 | Klausner et al. ............... 702/181 |
| 7,124,059 B2 | | 10/2006 | Wetzer et al. |
| 7,127,373 B2 | * | 10/2006 | House et al. ................... 702/182 |
| 7,167,786 B2 | | 1/2007 | Sinex |
| RE39,618 E | | 5/2007 | Levine |
| 7,216,059 B2 | * | 5/2007 | Kanai ............................ 702/184 |
| 7,286,966 B2 | * | 10/2007 | Hotta et al. .................... 702/184 |
| 7,444,294 B2 | * | 10/2008 | Nomoto et al. ..................... 705/7 |
| 7,454,260 B2 | * | 11/2008 | Biegler et al. ..................... 700/99 |
| 7,483,774 B2 | * | 1/2009 | Grichnik et al. ................ 701/29 |
| 7,496,475 B2 | * | 2/2009 | Byrne et al. ................... 702/184 |
| 7,536,364 B2 | * | 5/2009 | Subbu et al. .................... 706/13 |
| 7,937,280 B1 | * | 5/2011 | Leung et al. ....................... 705/6 |
| 8,117,007 B2 | * | 2/2012 | Yitbarek et al. ............. 701/29.4 |
| 2002/0049563 A1 | * | 4/2002 | Vetter et al. .................... 702/184 |
| 2003/0100974 A1 | | 5/2003 | Alvarez et al. ................ 700/286 |
| 2004/0128117 A1 | | 7/2004 | Crandall et al. ................... 703/2 |
| 2004/0193467 A1 | | 9/2004 | Williams et al. ................... 705/8 |
| 2004/0220847 A1 | | 11/2004 | Ogushi et al. ...................... 705/9 |
| 2005/0203789 A1 | * | 9/2005 | Kauffman et al. ................ 705/8 |
| 2006/0111871 A1 | * | 5/2006 | Winston et al. ............... 702/184 |
| 2007/0088584 A1 | * | 4/2007 | Aragones et al. .................. 705/7 |
| 2007/0112486 A1 | | 5/2007 | Avery et al. |
| 2007/0112487 A1 | | 5/2007 | Avery et al. |
| 2007/0112488 A1 | | 5/2007 | Avery et al. |
| 2007/0112489 A1 | | 5/2007 | Avery et al. |
| 2008/0154459 A1 | * | 6/2008 | Grichnik et al. ................. 701/29 |
| 2008/0168015 A1 | * | 7/2008 | Thie et al. ....................... 706/46 |
| 2009/0106067 A1 | * | 4/2009 | Mann et al. ....................... 705/8 |
| 2009/0138324 A1 | * | 5/2009 | Nagafuchi et al. ................ 705/9 |
| 2009/0138334 A1 | * | 5/2009 | Henby et al. ................... 705/10 |
| 2012/0101863 A1 | * | 4/2012 | Truax et al. ................. 705/7.12 |
| 2012/0166249 A1 | * | 6/2012 | Jackson ...................... 705/7.28 |

FOREIGN PATENT DOCUMENTS

| | | | |
|---|---|---|---|
| WO | WO0146014 A1 | | 6/2001 |
| WO | WO02017138 A3 | | 8/2003 |
| WO | WO 2005020112 A1 | * | 3/2005 |
| WO | WO 2006095174 A2 | * | 9/2006 |

OTHER PUBLICATIONS

Chang, C.S. et al. "Evolutionary Multi-Objective Optimization of Substation Maintenance using Markov Model." The 14th International Conference on Intelligent System Applications of Power Systems, Kaohsiung, Taiwan, Nov. 4-7, 2007. pp. 77-82. <www.ee.nsysu.edu.tw/isap2007cd/papers/f0239.pdf>.*

Greitzer, Frank L. et al. "Gas Turbine Engine Health Monitoring and Prognostics." International Society of Logistics (SOLE) 1999 Symposium, Las Vegas, Nevada, Aug. 30-Sep. 2, 1999. pp. 1-7. <www.pnl.gov/redipro/pdf/tedannsole99.pdf>.*

Meher, Cyrus B. et al. "An Approach for the Integration of Condition Monitoring and Multiobjective Optimization for Gas Turbine Maintenance Management." The 3rd Internation Monitoring and Diagnostic Conference, Las Vegas, Nevada Dec. 9-12, 1991. <www.srl.gatech.edu/publications/1991/fm.meher.confpro.lasvegas.1991.pdf>.*

Nggada, Shawulu H. et al. "Dynamic Effect of Perfect Preventive Maintenance on System Reliability and Cost Using HiP-HOPS." 2010. <www2.hull.ac.uk/science/pdf/HiP-HOPS.pdf>.*

* cited by examiner

PROCESS AND SYSTEM FOR MULTI-OBJECTIVE GLOBAL OPTIMIZATION OF MAINTENANCE SCHEDULES

FIELD OF THE INVENTION

The invention relates to maintenance schedules and costs. More particularly, the invention relates to a system and process for determining schedules that minimize maintenance costs of fleet management programs.

BACKGROUND OF THE INVENTION

An important aspect of cost-effectively executing a Fleet Management Program (hereinafter "FMP") is determining maintenance schedules (MS) that minimize maintenance costs such as the cost of maintenance work and of parts of an engine over a longer time interval. Maintenance schedules depend upon a number of parameters such as maintenance time intervals, thresholds for changing or upgrading engine components, etc. The challenge lies in determining which parameter values minimize the resultant maintenance costs of an engine during an interval of the lifetime of the engine.

This determination is generally characterized as a multi-objective global optimization problem, where the objectives are the mentioned costs. For improved cost predictions it may be useful to take into account not only the current state of an engine to be serviced but to consider also an estimated cost incurred at future shop visits during the lifetime of the engine. Moreover, the cost predictions may be further improved by taking into account future probabilities of failure during the service life of the engine. These aspects are usually handled by simulations of the service life of the engine taking into account stochastic events. Thus, the multi objective global optimization problem of optimizing a maintenance schedule has in addition both a time dependent characteristic and a stochastic characteristic. Moreover, a maintenance schedule by itself may be a quite complex and long running program that considers different combinations of parts to be replaced and different types of work that may be implemented and that takes into account the usage of the parts and other aspects of maintenance to propose a current best set of maintenance decisions. Such maintenance decisions may include what parts have to be replaced and what maintenance work has to be performed. The optimization problem is nonlinear and has constraints.

Generally, the multi-objective global optimization problem is a mixed integer problem since some optimization parameters may be integer variables, such as decisions to be taken or not taken, or continuous variables such as time limits. All these aspects of the multi-objective global optimization problem usually make the optimization problem hard to solve. Difficulties with classical optimization approaches when facing such problems are known to one of ordinary skill in the art. For example, classical exhaustive optimization techniques can provide high confidence that the best solutions are found, such as by enumerations; grid searches, or graph searches; however, these techniques require too large computational time especially when considering a larger number of parameters. In contrast, branch and bound techniques are known to have difficulties handling multiple objectives. Stochastic approaches, such as evolutionary algorithms, simulated annealing, genetic algorithms, tend to find local optima and may provide limited confidence that global optima are found, while gradient based or pattern search approaches tend to find a local optimum, etc.

Therefore, for the optimization of maintenance schedules of aircraft engines, there exists a need for a multi objective optimization procedure that takes into account the time dependent and stochastic nature of the problem and that is designed to overcome the above mentioned difficulties.

SUMMARY OF THE INVENTION

In accordance with one aspect of the present disclosure, a process for optimizing maintenance work schedules for at least one engine broadly comprises retrieving at least one set of data for an engine from a computer readable storage medium; selecting at least one scheduling parameter for the engine; selecting a set of maintenance rules for the engine; selecting at least one maintenance work decision; selecting at least one objective for said engine; optimizing the at least one objective to generate at least one optimal maintenance work decision; and generating at least one optimal maintenance work schedule for the engine.

In accordance with another aspect of the present disclosure, a system comprising a computer readable storage device readable by the system, tangibly embodying a program having a set of instructions executable by the system to perform the following steps for optimizing maintenance work schedules for at least one engine, the system broadly comprising means for retrieving at least one set of data for an engine from a computer readable storage device; means for selecting at least one scheduling parameter for the engine; means for selecting a set of maintenance rules for the engine; means for selecting at least one maintenance work decision; means for selecting at least one objective for the engine; means for optimizing the at least one objective to generate at least one optimal maintenance work decision; and means for generating at least one optimal maintenance work schedule for the at least one engine.

In accordance with yet another aspect of the present disclosure, a process for optimizing maintenance work schedules for at least one industrial system broadly comprises retrieving at least one set of data for at least one industrial system from a computer readable storage medium; selecting at least one scheduling parameter for the at least one industrial system; selecting a set of maintenance rules for the at least one industrial system; selecting at least one maintenance work decision for the at least one industrial system; selecting at least one objective for the at least one industrial system; optimizing the at least one objective to generate at least one optimal maintenance work decision for the at least one industrial system; and generating at least one optimal maintenance work schedule for the at least one industrial system.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Maintenance schedules for industrial systems of parts, such as engines, are plans or programs for repairing or replacing system parts at given time intervals or when certain events (e.g., failures) happen. The MS module decides what parts may be replaced and what maintenance work may be performed on an engine, at a specified shop visit. Generally, a MS receives as input a system or engine in a given state, defined by measures of the life of the engine parts, by engine measurements, and by a maintenance history of the engine. Based on MS parameters X, the MS produces as output another state of the engine, providing parts to be upgraded or changed, and maintenance work to be performed on the engine. In addition, MS returns a scheduled maintenance date for the output engine, and other information such as costs of parts and work performed.

Figure 1:
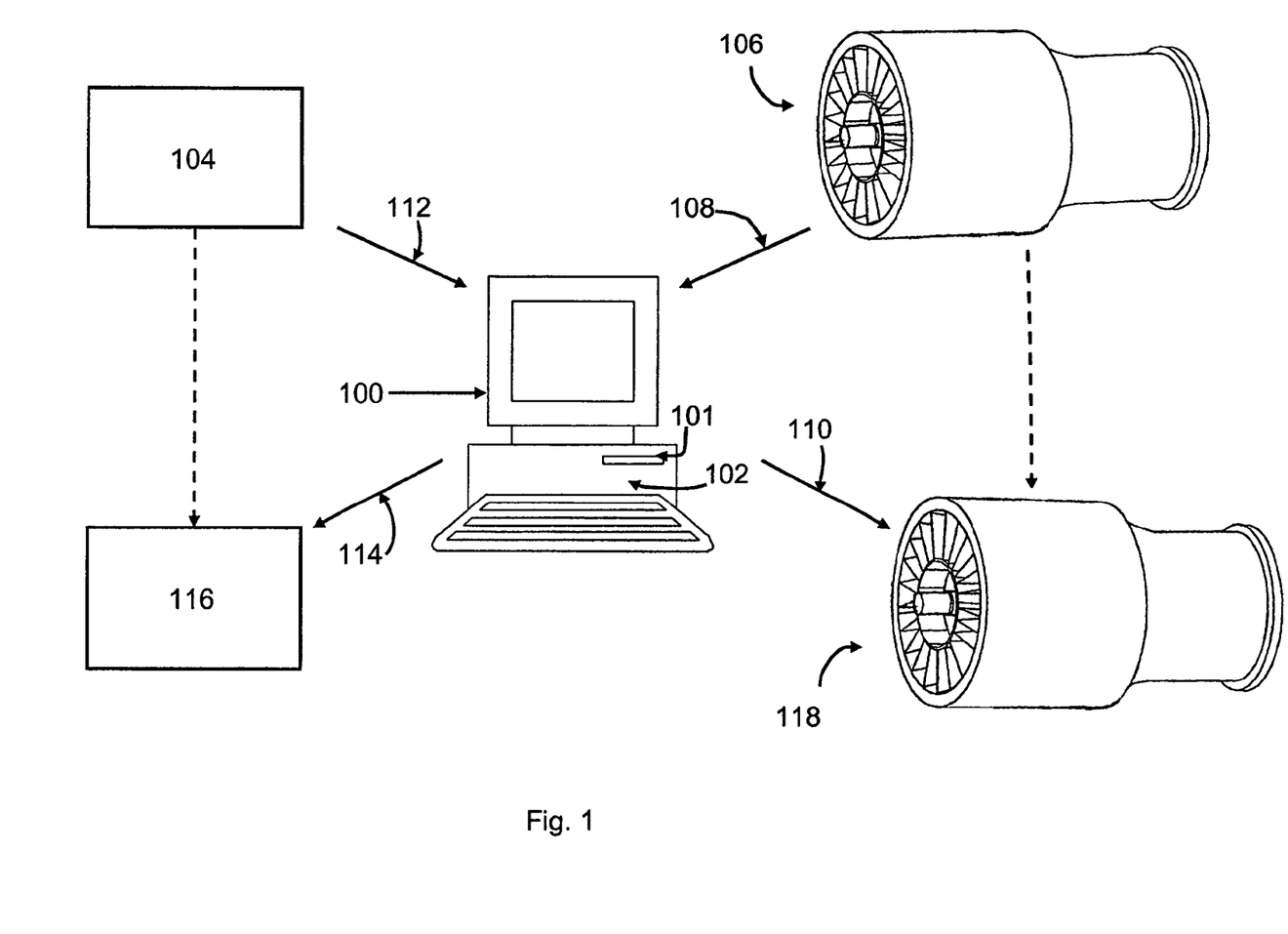
FIG. 1 is a representation of a system embodying the multi-objective global maintenance schedule optimizer described herein.

Referring to FIG. 1 as an example, a multi-objective global maintenance schedule optimizer system and process described herein may be embodied tangibly in a computer readable medium 101, loaded within a computer 100 as discussed later in greater detail, and/or stored in a computer readable storage medium 102 and executed using the computer 100. Generally, the exemplary system and process may receive as input 108, 112 an engine 106 or industrial system 104, respectively, in the aforementioned given states. Based on MS parameters X, the exemplary system and method produces as output 110, 114, another state of the engine 118 or industrial system 116, respectively, as described above. In addition, the exemplary system and process returns a scheduled maintenance date for the output engine 118 or industrial system 116 and the aforementioned information.

To achieve these results an MS may use different algorithms such as stochastic optimization, combinatorial searches, exhaustive searches, heuristic decision rules, or other optimization approaches known to one of ordinary skill in the art. The particular ways by which an MS obtains its decisions are not particularly relevant. The decision parameters X may be discrete or continuous such as: given time thresholds for future shop visits, engine operation variables or thresholds, part life thresholds, part upgrade thresholds, or parameters of decision rules used for maintenance.

A main purpose of the optimization of the MS described herein is to find the values of the parameters X that will produce an MS such that the total expected engine maintenance cost, including part costs and work costs incurred in a given time interval such as a contract interval, should be minimal. For fixed values of X, such costs may be computed in an average way, for example using Monte Carlo techniques to simulate a set of engine life realizations and averaging the costs of said realizations. The averaging may take into account the probabilities that a given life realization will happen, for example, taking into account the probabilities of failure associated with events that happened in a particular life realization of the engine. Such formulations are known to one of ordinary skill in the art, for example, multiplying the costs incurred at a given shop visit by the probability by which said shop visit happened.

The simulation of the engine life realizations may be performed by an engine life simulator. More particularly, the engine life simulator module may simulate time sequences of shop visits in the life of an engine. Such shop visits may be either scheduled by the MS or may be random, for example, determined by failure probabilities. The estimation of the different costs may be performed by the cost evaluator. Hence, the cost evaluator may estimate one objective or several objectives $O_1(X), \ldots, O_n(X)$ for the given parameters X, using the costs and probabilities obtained from a set of engine life simulations. The set of objectives $O_1(X), \ldots, O_n(X)$ may represent, for example, the cost(s) of part(s), and the cost(s) of work performed over a time interval of the life of an engine and associated costs, contract related costs, and the like. The optimization module may incorporate a multi-objective optimizer described herein that finds values of parameters X that minimize the objectives $O_1(X), \ldots, O_n(X)$.

An exemplary single-level multi-objective global optimization module described herein may construct a set of parameter values X; and for each X the optimization module may evaluate an MS(X) on a set of engine life realizations generated by the engine life simulator. The single-level multi-objective global optimization module may obtain the values of the objectives $O_1(X), \ldots, O_n(X)$, and then select the best X based on these objectives.

A multi-level or hierarchical MS optimizer described herein may be a process comprising a sequence of single level MS optimizers, the levels going from low to high fidelity. A lower fidelity module may be a faster, coarser, simpler representation of a higher level module. Lower fidelity models may be approximations of high fidelity models, often being reduced order models, surrogate models, or lumped models. For example, a low fidelity MS may lump together subsets of parts and use pre-computed solutions or heuristic rules for faster decisions. Lower fidelity simulators may use larger time steps, coarser probability steps, or smaller numbers of simulation steps.

Coarse level optimizers may use larger search steps, a smaller number of optimization parameters, and find approximate solutions indicating the regions of the finer level solutions. The types of optimizers may differ on different levels, for example a coarse level optimizer may be a robust global search, while a fine level optimizer may be a gradient based optimization acting only locally close to the best solutions found by the coarse level optimizer.

The multi-objective global optimization process and system and variations thereof described herein may be implemented using any one of a number of exemplary embodiments, some of which will now be discussed.

Figure 2:
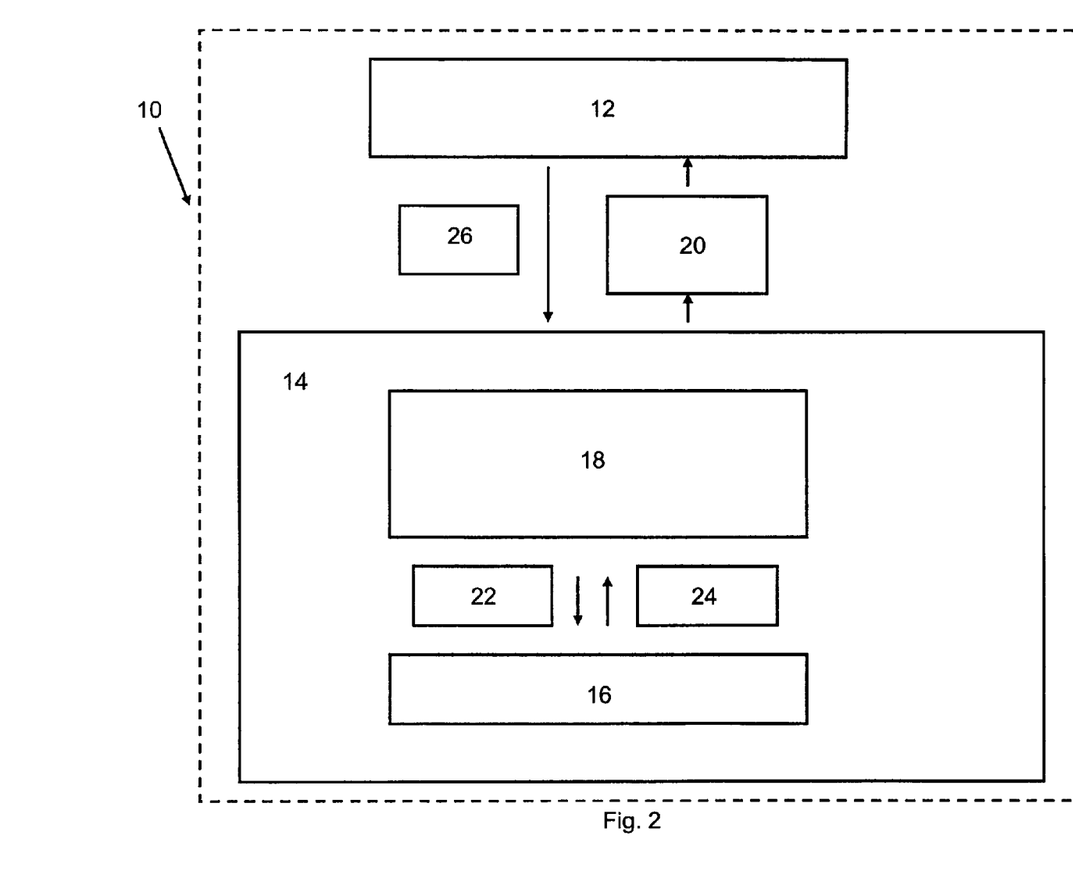
FIG. 2 is a representation of a schematic for a single level maintenance schedule optimizer.

Referring now to FIG. 2, a representation of a top level scheme of the multi-objective global optimization system utilizing the exemplary multi-objective global optimization module and employing the process described herein is shown. An exemplary single level schedule optimizer 10 may comprise an optimization module 12, a simulation and MS module 14 having a maintenance scheduler module 16 and an engine life simulator module 18, and a cost evaluator module 20.

The optimization module 12 generally ascertains at least one scheduling parameter X 26 that may optimize a set of Objectives $O_1(X), \ldots, O_n(X)$. The decision parameters X may be discrete or continuous such as: given time thresholds for future shop visits, engine operation thresholds, part life thresholds, part upgrade thresholds, or parameters of decision rules used for maintenance, and the like. The set of Objectives $O_1(X), \ldots, O_n(X)$ may represent, for example, the cost(s) of part(s), cost(s) of work over a time interval of the life of an engine and associated costs, contract related costs, and the like.

The exemplary global optimization module 12 may be implemented by any one of a number of classic optimization techniques such as mixed integer optimization algorithms (e.g., branch and bound) when only one objective is present, e.g., when a single compound objective is chosen as a weighted sum of the n objectives as: $O(X)=O_1(X)w1+ \ldots +O_n(X)wn$. Here $w1, \ldots, wn$ are weights that multiply the objectives $O_1(X), \ldots, O_n(X)$. A multi-objective optimization may be used when more than one objective is present. Any of the multi-objective optimizations techniques described in literature or implemented in commercial optimization software such as in Matlab or iSIGHT may be used. Deterministic approaches (e.g., mesh searches, graph searches, and the like) or stochastic techniques (Monte Carlo, genetic/evolutionary algorithms, simulated annealing, and the like) may also be utilized.

The simulation and MS module 14 may include a maintenance schedule module 16 and an engine life simulator module 18. The maintenance scheduler module 16 is a decision tool that may be used to decide what maintenance work may be performed on a given engine, at a given shop visit. Generally, the maintenance schedule module 16 may be a program that incorporates sets of maintenance rules as known to one of ordinary skill in the art and accepts as parameters the aforementioned scheduling parameters X. The MS may encompass different levels of fidelity and may incorporate optimizations by itself to determine the best maintenance decision for each particular shop visit of a given engine. For example, the MS may incorporate combinatorial or stochastic algorithms in order to carry out the determination(s).

The engine life simulator module 18 may simulate sequences of shop visits in the life of a part. Such shop visits may be scheduled by the maintenance scheduler 16 or may be unscheduled, e.g., a shop visit may occur randomly due to different causes with certain probability distributions. Generally, the engine life simulator module 18 may, for example, generate sequences of deterministic and random time events in the life of an engine, take decisions using the maintenance scheduler 16 with at least one parameter X, update engine states as a result of the maintenance performed, generate data for use by the cost evaluator module 20, and the like. In addition, the engine life simulator module 18 may send engine and event data 22 to the maintenance scheduler 16 and receive maintenance decisions and costs 24 from the maintenance scheduler 16.

The cost evaluator module 20 may utilize data generated by the engine life simulator module 18 to compute the aforementioned set of objectives $O_1(X), \ldots, O_n(X)$ for the given values of at least one parameter X. Such data may include different costs and probabilities of events incurred during a set of life realizations of a given part.

Figure 3:
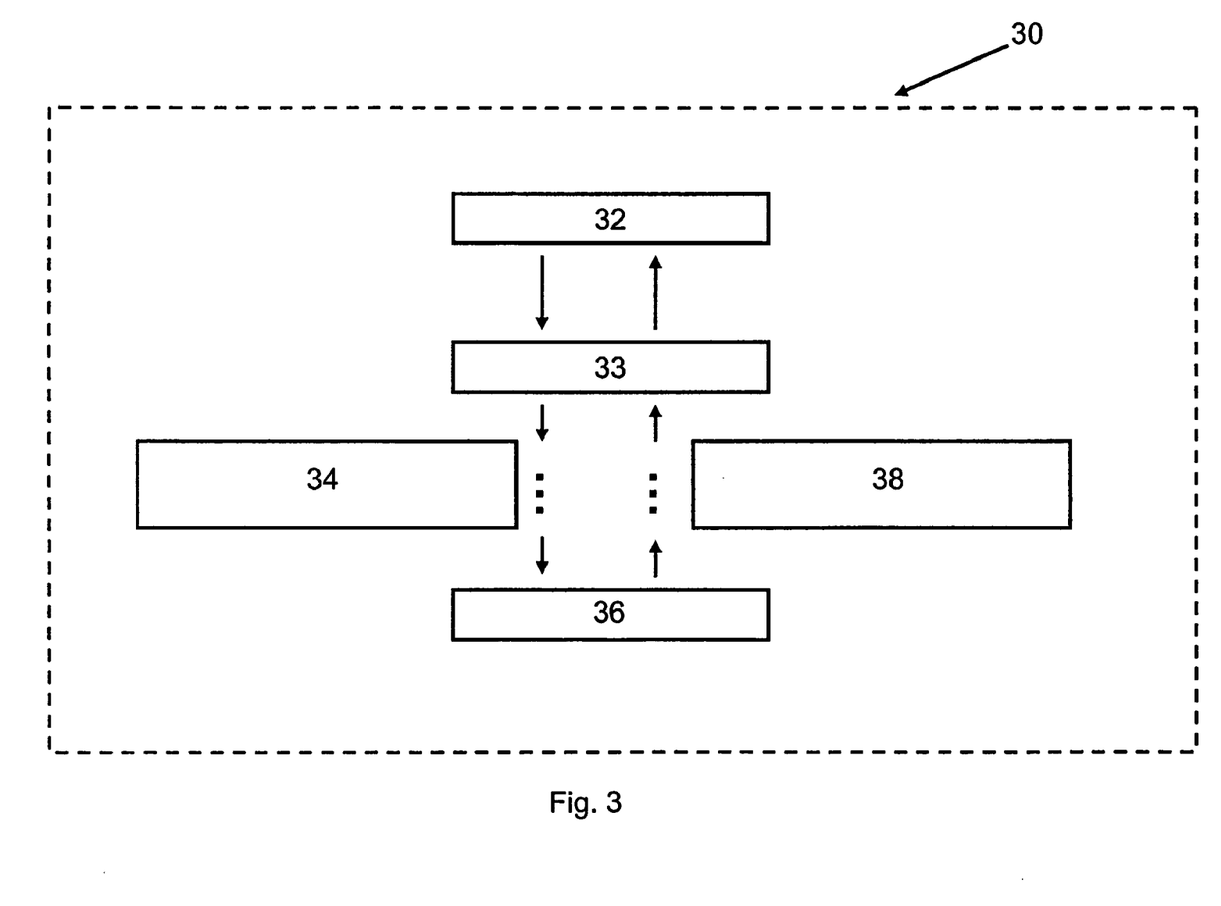
FIG. 3 is a representation of a hierarchical maintenance schedule optimizer with one schedule optimizer per level.

Referring now to FIG. 3, the multi-objective global optimization system and process described herein may be exemplified in another embodiment. The exemplary multi-objective optimization system and process may be embodied in a hierarchical MS optimizer 30 having at least one MS optimizer per each level 32, 33, 36, each of which is an MS optimizer 10 as described in FIG. 2.

In the hierarchy, as each level progress higher (Level k, . . . , Level 1), the fidelity of the optimization, simulation and decision modules also becomes higher, Level 1 being the highest fidelity level 32. Higher level modules 32 (e.g., Level 1 MS Optimizer) may send information 34 such as engine data, failure probabilities, maintenance data, and the like, to lower level modules 36. The lower level MS optimizers 36 (e.g., Level k Optimizer) may provide information 38 on optimal solutions such as approximate solutions, ranges of solutions, and the like, to the higher level modules. For example, where k=2 and a two level hierarchical optimizer is being utilized, the lower level simulation and MS module 16 may use larger time simulation steps and/or a smaller number of simulations for each given parameter X.

In this exemplary embodiment, a level k=2 maintenance scheduler 16 may be a simplified maintenance scheduler, e.g., utilizing fewer look ahead steps, larger steps; using combinations of parts; utilizing heuristic decision rules; or using databases of previous solutions for approximating decisions. Likewise, on level k=2, the maintenance scheduler 16 may also comprise a different optimization technique than the optimization techniques used by the level k=1 MS. Similarly, the two MS optimizers 12 used on levels 1 and 2 may be different. For example, the different optimization techniques may include a combinatorial optimization, an exhaustive search, a stochastic decision optimization, and the like. The lower level MS optimizer, e.g., a Level 2 MS Optimizer 33, may send a set of optimal solutions to the higher level MS optimizer, e.g., Level 1 MS Optimizer. The high level MS optimizer may begin with these solutions and improve upon them by further optimization using higher fidelity models. In this manner, a sequence of levels may be employed in the alternative. The lower level MS optimizers would hierarchically reduce the vast search space of all possible solutions and indicate the regions where the best solutions may be found. The higher level optimizers may then further refine the regions of the good solutions, working locally in the regions discovered by the lower level optimizers. For example, the lower level optimizer may constitute the exemplary multi-objective global optimizer described herein while the higher level optimizer may be a local optimizer such as a gradient based optimizer or a pattern search optimizer.

Figure 4A:
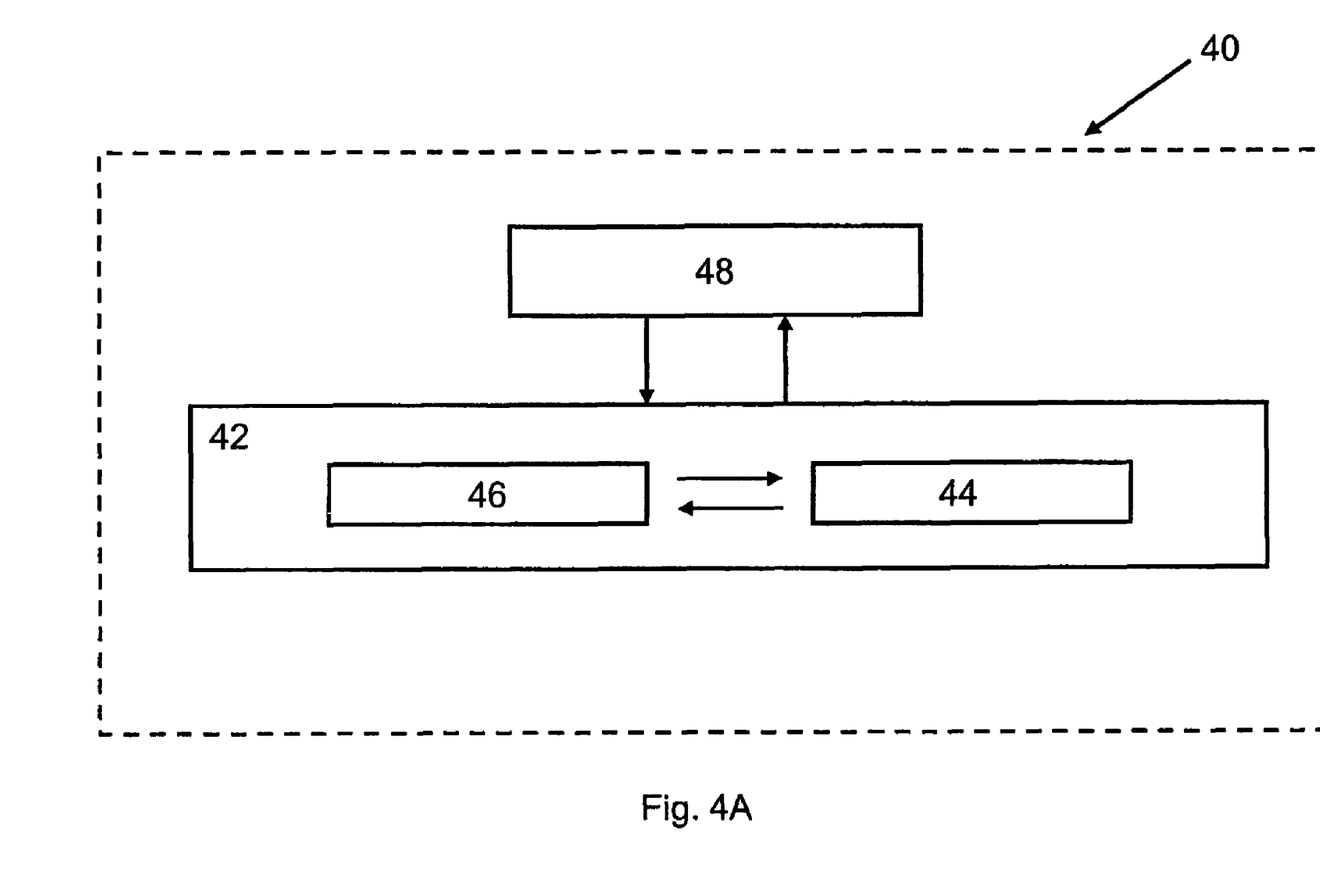
FIG. 4A is a representation of a two level hierarchical maintenance schedule optimizer with two schedule optimizers on the second level.
Figure 4B:
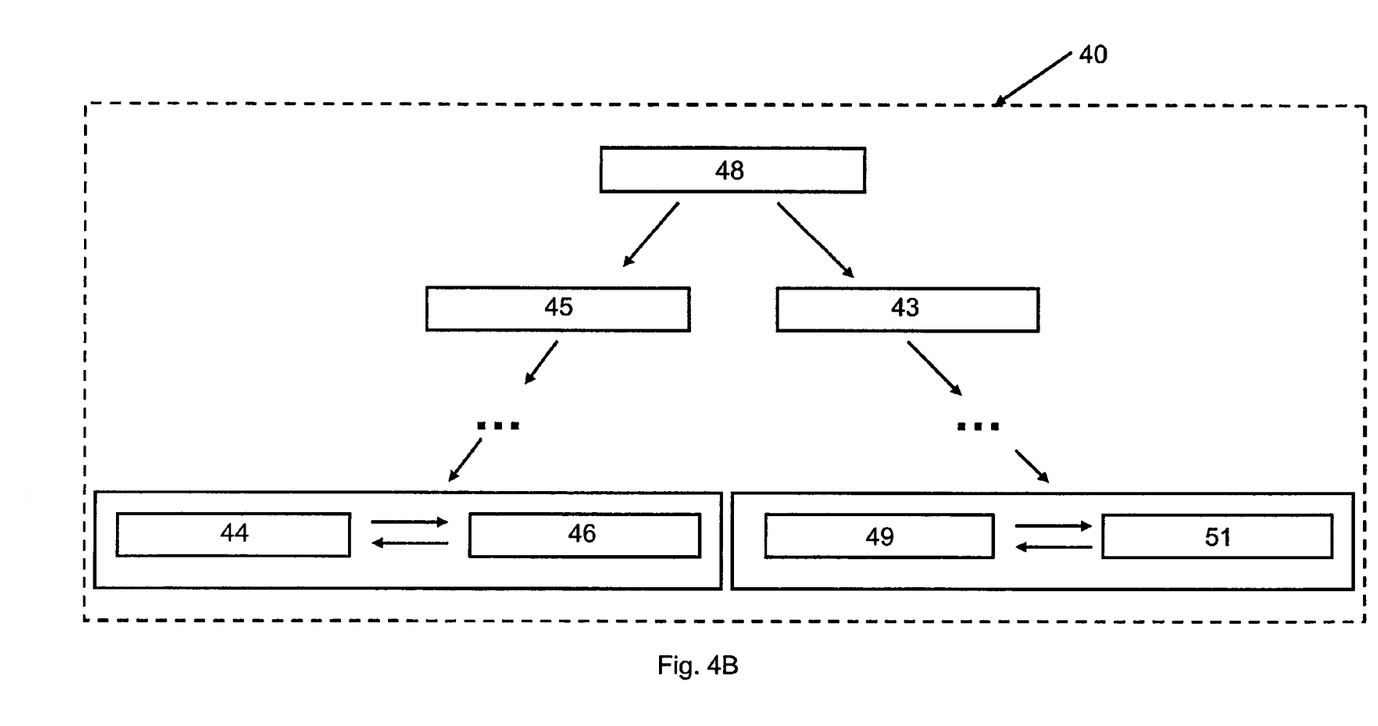
FIG. 4B is a representation of a hierarchical maintenance schedule optimizer with multiple schedule optimizers per level.

Referring now to FIGS. 4A and 4B, the multi-objective global optimization system and process described herein may be exemplified in yet another embodiment. The exemplary multi-objective optimization system and process may be embodied in a hierarchical schedule optimizer 40 having two levels where the lower level optimizer 42 (e.g., Level 2 Optimizer) may comprise two coupled single level MS optimizers 44, 46 (See FIG. 3A). The hierarchical schedule optimizer 40 of FIG. 3A may comprise any number of MS optimizers on level 2 coupled in any desired input-output structure.

The embodiment of optimizer 40 shown in FIG. 4B may be expanded to encompass any number of levels larger or equal to 2. On each level, the hierarchical optimizer may have any number of MS optimizers coupled in any proper input-output structure, such as optimizers 43 and 45, and optimizers 44, 46, 49 and 51. The Level 2 Optimizer 45 may contain a single MS optimizer or may contain two or more MS optimizers as the MS Optimizer 42 of FIG. 4A, where MS optimizer 42 contains optimizers 44 and 46 coupled together. The same structure may be applicable to Level 2 Optimizer 43 of FIG. 4B. For example, if three levels are present, i.e., k=3, then FIG. 4B may illustrate an embodiment where the structure of three optimizers 45 and 44, 46 may be similar to the structure of three optimizers 48 and 44, 46 of FIG. 4A. Likewise, the structure of three optimizers 43 and 49, 51 of FIG. 4B may be similar to the structure of three optimizers 48 and 44, 46 of FIG. 4A.

For example, FIG. 4B illustrates that subsets of MS optimizers may be grouped together and coupled by input-outputs on any of the levels, for example, optimizers 44, 46, 49 and 51 may all be coupled, respectively, on level k. Each of the MS optimizers on any of the levels may use a different set of optimization parameters Y that are subsets of the parameters X. For example, when considering FIG. 4A, the optimizers 44 and 46 may use the subsets of parameters $X_1$ and $X_2$, respectively, that are subsets of X of the higher level optimizer 48. The set of optimization parameters $X_1$ and $X_2$ may or may not share some common parameters, e.g., if X={x, y, z}, then one embodiment may have two MS optimizers, 44 and 46, with common variables y such as $X_1$={x, y}, $X_2$={y, z}; or the sets of variables of the 2 MS optimizers may not have common variables, such as $X_1$={x, y}, $X_2$={z}.

The single level optimizers 44, 46 may communicate with each other and share optimal solution information with one another. For example, when $X_1$={x, y}, $X_2$={y, z}, the optimizer 44 may execute first, identify an optimal solution {$x_1$, $y_1$}, send the solution $y_1$ to optimizer 46 who may execute to find the solution {$y_2,z_2$}, then 46 would send the output $Y_2$ to the optimizer 44 which would continue in the same way. This example may be used to illustrate possible interactions between optimizers. Also, the single level optimizers 44, 46 may operate sequentially, as described in the previous example, or simultaneously, e.g., both MS optimizers may act simultaneously.

One example to illustrate the simultaneous operation of the optimizers may have $X_1$={x, y}, $X_2$={z}, i.e., the optimizers 44 and 46 act without direct interactions on level 2. The solution {x, y, z} found on level 2 may be sent to the level 1 MS optimizer which may perform an optimization iteration to generate {$x_2, Y_2, Z_2$} on level 1, then send these solutions to level 2 where the optimizers 44 and 46 would continue the optimization from {$x_2, Y_2, Z_2$} and so forth. This is a generic way by which a higher level optimizer may couple lower level optimizers. In this case, the lower level MS optimizers may contain a smaller number of variables. This example may also suggest one reason why a hierarchical MS optimizer may be more efficient than the single level 1 MS optimizer, by reducing an expensive high level 1 optimization work to work performed by lower dimensional optimizers on levels k>1.

Figure 5:
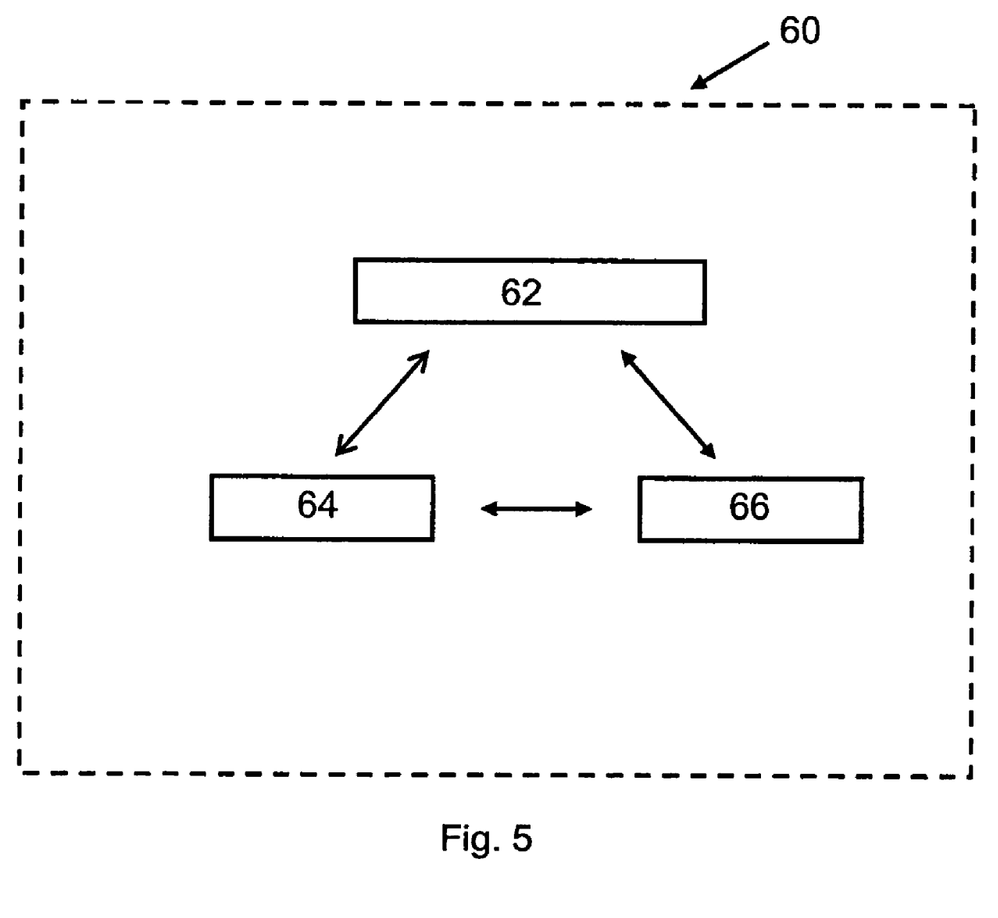
FIG. 5 is a representation of an optimization module utilizing searches and elimination criteria.

Referring now to FIG. 5, the single and multi-objective optimization techniques and approaches described herein, for example, an optimization module 60 for use with the multi-objective global optimization process and system described herein, may be executed using at least one search 62 coupled with at least one elimination criteria 64 and at least one constraint 66 as illustrated in FIG. 4. The searches 62 may be deterministic approaches such as grid, mesh, and the like, or may be stochastic approaches such as Monte Carlo, evolutionary algorithms, genetic algorithms, and the like. The constraints 66 may be any one of a number of types as known to one of ordinary skill in the art, for example, bounds of variables, or logical constraints imposed by the rules of the maintenance scheduler. In addition, the constraints 66 may be included as penalties in the objectives or treated as additional objectives to be minimized.

Elimination criteria 64 may be constructed while the searches 62 are being executed. Regions of poor solutions may be identified and eliminated from the searches 62, that is, the elimination criteria may act as new constraints that may prevent the searches from evaluating solutions in poor regions.

Elimination criteria may then increase the efficiency of the optimization by reducing the search space. This may be especially effective if the elimination of the poor regions is performed on a coarse level using faster simulations and simplified maintenance schedules. Moreover, the low level optimizers may use exhaustive techniques to search the whole domain of solutions and identify the regions of possible good solutions. Good solutions may be sought in these regions by the higher fidelity optimizers. Such hierarchical optimizers may provide both the confidence provided by exhaustive searches and the accuracy of the local optimizers. Other types of optimizations may be used as well and each MS optimizer on each level may use a different type of optimization.

Figure 6:
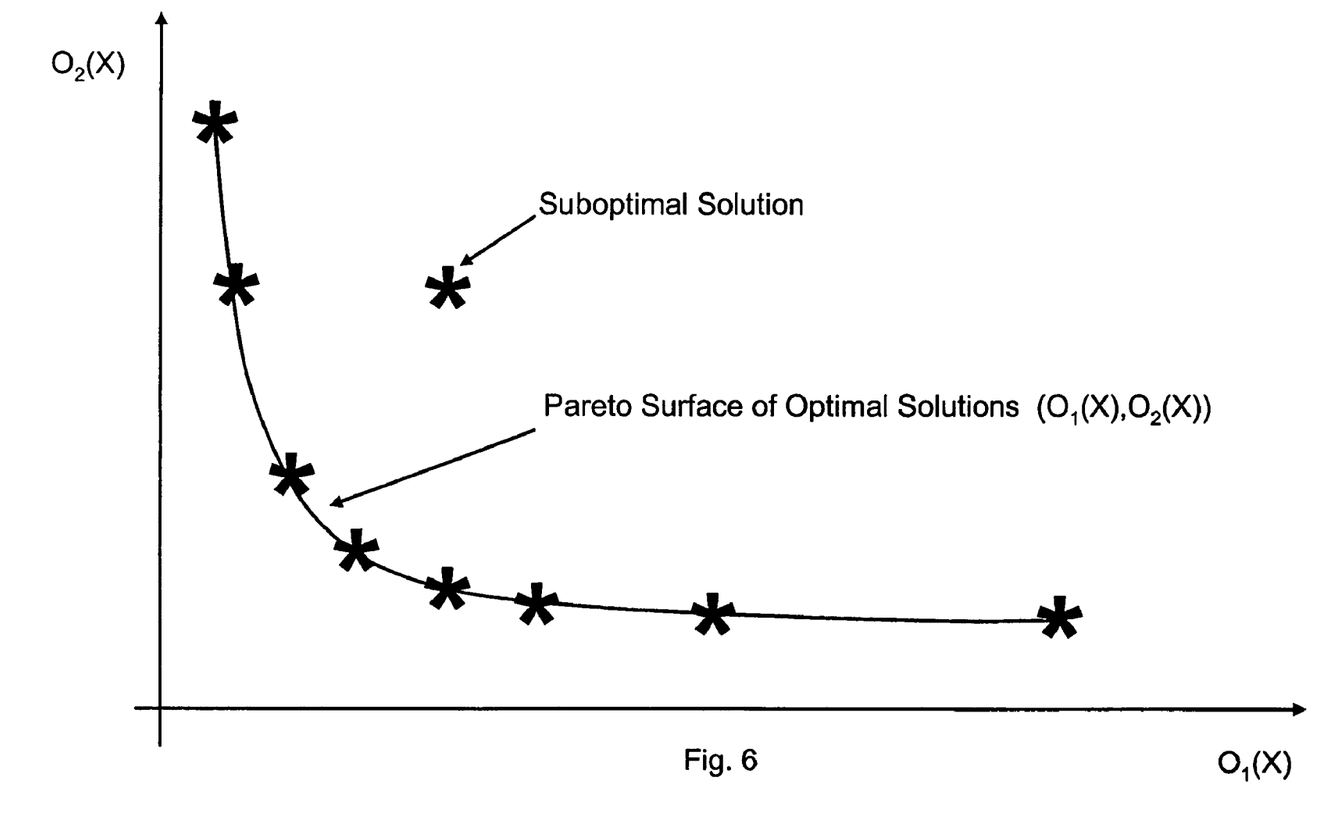
FIG. 6 is a representation of a graphical plot of a multi-objective optimization Pareto surface.

FIG. 6 illustrates the Pareto surface of optimal solutions for a case that uses two objectives $O_1(X)$ and $O_2(X)$ The two objectives may be, for example, the cost of parts and the cost of work cumulated during the life of a given engine. The parameters X of the solutions on the Pareto surface are optimal or best in the sense that there is no other set of parameters Y for which both objectives $O_1(Y)$ and $O_2(Y)$ are smaller, that is, there is no Y better than X, i.e., such that $O_1(Y)<O_1(X)$ and $O_2(Y)<O_2(X)$. The Pareto surface for any number of objectives $O_n(X)$ may be defined in the same way as for 2 objectives, that is, X is optimal if there is no Y such that ($O_1(Y)$, $O_2(Y)$, . . . , $O_n(Y))<(O_1(X), O_2(X), . . . , O_n(X))$. In a hierarchical optimization approach, the poor regions, i.e., regions away from the Pareto surface, may be eliminated hierarchically, and the searches may focus on the good regions near the Pareto surface, as described above in the discussion on elimination criteria. The hierarchical optimizer finds the Pareto surface hierarchically. A broad search may be performed using low fidelity models, for example, the simulator and MS may be simplified and used in a search to approximate the region containing the Pareto surface. This region may be further refined at higher levels using higher fidelity models. This approach suggests an efficient hierarchical multi-objective optimization technique.

Referring again to FIG. 5 and the exemplary embodiment illustrated, the effectiveness of the searches may come close to the results of exhaustive searches by providing high confidence that the best global solutions have been found. However, searches utilizing elimination criteria are far more effective than exhaustive searches since the largest part of the poor solutions may be eliminated using the elimination criteria (See FIG. 5). In addition, local optimizations, for example, gradient based or pattern searches, may be added locally during highest level optimizations.

Figure 7:
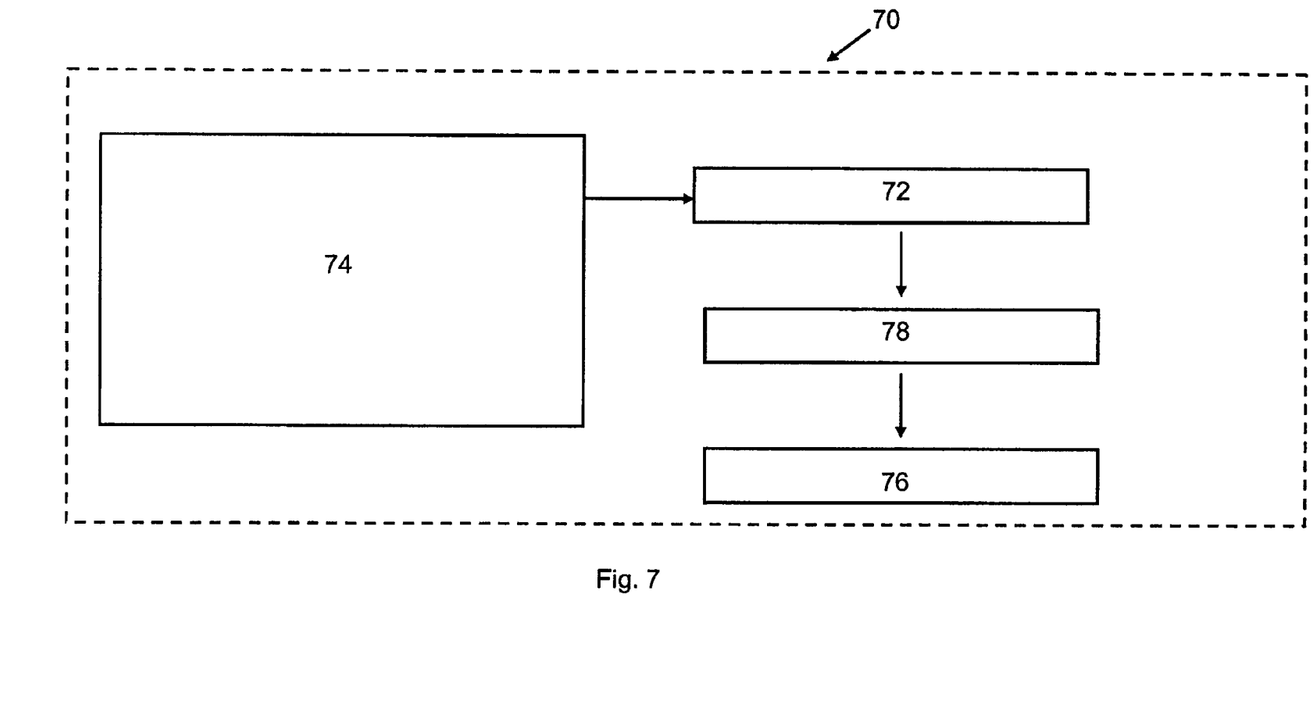
FIG. 7 is a representation of multi-objective global optimization scheme.

Referring now to FIG. 7, the multi-objective global optimization process and system may be utilized for tuning at least one parameter X of a maintenance scheduler. Tuning the maintenance scheduler will assist maintenance personnel to determine whether or not an engine requires a shop visit, whether or not any component(s) of the engine should be repaired, replaced or scrapped, and the like. The multi-objective global optimization system and process described herein may comprise an executable program, that is, a set of instructions, embodied tangibly in a computer readable medium 101 and/or stored in a computer readable storage device 102 and executed using a computer 100 (See FIG. 1). The illustrated computer 100 may represent a server, desktop, laptop, personal digital assistant, and the like, and may be networked using a WLAN, Ethernet, and the like, and may also be part of a distributed computing system as known to one of ordinary skill in the art. The various modules, and all their alternative embodiments, may all be embodied tangibly in the same aforementioned computer readable mediums, storage devices, and the like, as known to one of ordinary skill in the art. Another embodiment generalizes the above description to distributed computing systems, as may be understood by the skilled in the art, i.e., multiple connected computers may store different parts of the data and may run any of the mentioned modules, such as the MS, optimizers, engine life simulators, etc.

For example, a multi-objective global optimization system 70 may execute the multi-objective global optimization process described herein to tune the aforementioned at least one parameter X of a maintenance scheduler for a fleet management program. A hierarchical schedule optimizer 72 may comprise any one of the exemplary multi-objective global optimization embodiments described herein, along with any and all permutations as recognized by one of ordinary skill in the art. The hierarchical schedule optimizer receives at least one data from a database 74 such as part history data in general, component and systems data specifically, maintenance data, maintenance history, engine performance parameter(s), failure probabilities for the parts and engine, costs associated with the maintenance of the engine, and the like.

The hierarchical schedule optimizer 72 receives the data from the database 74 and by utilizing the exemplary multi-objective global optimization process(es) described herein, for example in FIGS. 2-4B, determines those scheduling parameters X 78 that may optimize the objectives $O_1(X), \ldots, O_n(X)$. The scheduling parameters X that are identified become at least one optimal scheduling parameter X 78. An optimized maintenance schedule 76 that uses the optimal X is obtained, and it may be used to determine what maintenance work is required for the given engine at the current and future shop visits.

One or more embodiments of the present invention have been described. Nevertheless, it will be understood that various modifications may be made without departing from the spirit and scope of the invention. Accordingly, other embodiments are within the scope of the following claims.

What is claimed is:

1. A process for optimizing maintenance work schedules for at least one engine, comprising:
   retrieving at least one set of data for an engine from a computer readable storage medium;
   selecting at least one scheduling parameter for said engine;
   selecting a set of maintenance rules for said engine;
   selecting at least one maintenance work decision;
   selecting at least one objective for said engine;
   optimizing said at least one objective to generate at least one optimal maintenance work decision,
       said optimizing step comprising
           using a hierarchical multi-objective global optimization which integrates hierarchical searches with elimination criteria and with handling of constraints to evaluate said at least one objective by simulation of life realizations of said engine as time sequences of scheduled or random shop visits of said engine;
           evaluating said at least one objective, said at least one set of data
       and said at least one maintenance work decision based upon a set of engine life realizations;
           constructing a scheduled maintenance plan based upon the evaluation step; and
           generating a projected cost of at least one maintenance work decision based upon the construction step; and
   generating at least one optimal maintenance work schedule for said engine.

2. The process of claim 1, further comprising the evaluation step comprising using any one of the following approaches: deterministic approach and stochastic approach.

3. The process of claim 1, further comprising the selection step of said at least one scheduling parameter comprising selecting said at least one scheduling parameter based upon said at least one set of data.

4. The process of claim 1, further comprising the selection step of said set of maintenance rules comprising selecting said set of maintenance rules based upon the selection of said at least one scheduling parameter.

5. The process of claim 1, further comprising the selection step of said at least one maintenance work decision comprising the following steps:
   accepting said at least one scheduling parameter; incorporating said set of maintenance rules; and
   determining said at least one maintenance work decision based upon said at least one scheduling parameter and said set of maintenance rules.

6. The process of claim 5, further comprising the determination step comprising processing said at least one scheduling parameter and said set of maintenance rules using any one of the following approaches: deterministic approach and stochastic approach.

7. The process of claim 1, further comprising the selection step of said at least one objective comprising generating said at least one objective based upon said at least one set of data and said at least one maintenance work decision.

8. The process of claim 1, further comprising the generation step comprising generating at least one optimal maintenance work schedule based upon said at least one optimal maintenance work decision.

9. A system comprising a computer readable storage device readable by the system, tangibly embodying a program having a set of instructions executable by the system to perform the following steps for optimizing maintenance work schedules for at least one engine, the system comprising:
   means for retrieving at least one set of data for an engine from a computer readable storage device;
   means for selecting at least one scheduling parameter for said engine;
   means for selecting a set of maintenance rules for said engine;
   means for selecting at least one maintenance work decision;
   means for selecting at least one objective for said engine;
   means for optimizing said at least one objective to generate at least one optimal maintenance work decision,
       said optimizing means comprising
           means for using a hierarchical multi-objective global optimization which integrates hierarchical searches with elimination criteria and with handling of constraints to evaluate said at least one objective by simulation of life realizations of said engine as time sequences of scheduled or random shop visits for said engine;
           means for evaluating said at least one objective, said at least one set of data and said at least one maintenance work decision based upon a set of engine life realizations;
           means for constructing a scheduled maintenance plan based upon the evaluation step;
           means for generating a projected cost of at least one maintenance work decision based upon the construction step;
           means for selecting at least one cost effective maintenance work decision; and
           means for optimizing said at least one objective based upon said at least one cost effective maintenance work decision; and means for generating at least one optimal maintenance work schedule for said at least one engine.

10. The system of claim 9, further comprising said means for evaluating comprising means for using any one of the following approaches: deterministic approach and stochastic approach.

11. The system of claim 9, further comprising means for selecting said at least one scheduling parameter comprises means for selecting said at least one scheduling parameter based upon said at least one set of data.

12. The system of claim 9, further comprising means for selecting said set of maintenance rules comprising means for selecting said set of maintenance rules based upon the selection of said at least one scheduling parameter.

13. The system of claim 9, further comprising means for selecting said at least one maintenance work decision comprising:
means for accepting said at least one scheduling parameter;
means for incorporating said set of maintenance rules; and
means for determining said at least one maintenance work decision based upon said at least one scheduling parameter and said set of maintenance rules.

14. The system of claim 13, further comprising said means for determining comprising means for processing said at least one scheduling parameter and said set of maintenance rules and to use any one of the following approaches:
deterministic approach and stochastic approach.

15. The system of claim 9, further comprising said means for selecting said at least one objective comprising means for generating said at least one objective based upon said at least one set of data and said at least one maintenance work decision.

16. The system of claim 9, further comprising means for generating comprising means for generating at least one optimal maintenance work schedule based upon said at least one optimal maintenance work decision.

17. A process for optimizing maintenance work schedules for at least one industrial system, comprising:
retrieving at least one set of data for at least one industrial system from a computer readable storage medium;
selecting at least one scheduling parameter for said at least one industrial system;
selecting a set of maintenance rules for said at least one industrial system;
selecting at least one maintenance work decision for said at least one industrial system;
selecting at least one objective for said at least one industrial system;
optimizing said at least one objective to generate at least one optimal maintenance work decision for said at least one industrial system,
said optimizing step comprising
using a hierarchical multi-objective global optimization which integrates hierarchical searches with elimination criteria and with handling of constraints to evaluate said at least one objective by simulation of life realizations of said industrial system as time sequences of scheduled or random shop visits of said industrial system;
evaluating said at least one objective, said at least one set of data and said at least one maintenance work decision based upon a set of engine life realizations;
constructing a scheduled maintenance plan based upon the evaluation step;
generating a projected cost of at least one maintenance work decision based upon the construction step;
selecting at least one cost effective maintenance work decision; and
optimizing said at least one objective based upon said at least one cost effective maintenance work decision; and
generating at least one optimal maintenance work schedule for said at least one industrial system.

18. The process of claim 17, further comprising the evaluation step comprising using any one of the following approaches: deterministic approach and stochastic approach.

19. The process of claim 17, further comprising the selection step of said at least one scheduling parameter comprising selecting said at least one scheduling parameter based upon said at least one set of data.

20. The process of claim 17, further comprising the selection step of said set of maintenance rules comprising selecting said set of maintenance rules based upon the selection of said at least one scheduling parameter.

21. The process of claim 17, further comprising the selection step of said at least one maintenance work decision comprising the following steps:
accepting said at least one scheduling parameter;
incorporating said set of maintenance rules; and
determining said at least one maintenance work decision based upon said at least one scheduling parameter and said set of maintenance rules.

22. The process of claim 21, further comprising the determination step comprising processing said at least one scheduling parameter and said set of maintenance rules using any one of the following approaches: deterministic approach and stochastic approach.

23. The process of claim 17, further comprising the selection step of said at least one objective comprising generating said at least one objective based upon said at least one set of data and said at least one simulated maintenance work decision.

24. The process of claim 17, further comprising the generation step comprising generating at least one optimal maintenance work schedule based upon said at least one optimal maintenance work decision.

25. A system for optimizing a maintenance schedule for an aircraft engine comprising:
means for retrieving engine data describing part history data, component data, systems data, maintenance history, engine performance, failure probabilities, and costs;
means for storing engine maintenance parameters including time thresholds, engine operation thresholds, part life thresholds, and decision rules parameters;
means for automatically executing said maintenance schedule;
said maintenance schedule executing means receiving said engine data and said engine maintenance parameters as inputs and outputting maintenance work decisions and costs;
means for simulating engine life realizations as time sequences of scheduled or random shop visits of said engine and at each said visit implementing said maintenance work decisions of said maintenance schedule using said engine maintenance parameters;
means for evaluating multiple objectives comprising costs of work, parts, and a contract for said parameters using said life realizations generated by said means for simulating engine life realizations;

means for executing a multitude of single level schedule optimizers of said maintenance schedule, each said single level schedule optimizer having means for searching for values of said parameters producing optimal multiple objectives; and means for performing a hierarchical multi-objective global optimization of said maintenance schedule comprising means for executing said multitude of single level multi-objective global optimizations of said maintenance schedule;

means for transferring information between said single level multi-objective global optimizations;

means for searching a set using deterministic or stochastic techniques, means for defining constraints;

means for eliminating regions of poor solutions; and means for performing hierarchical searches on said parameters.

\* \* \* \* \*